(12) United States Patent
Nimri et al.

(10) Patent No.: US 6,975,721 B1
(45) Date of Patent: Dec. 13, 2005

(54) GLOBAL DIRECTORY SERVICE WITH INTELLIGENT DIALING

(75) Inventors: Alain Nimri, Austin, TX (US); Keath Milligan, Austin, TX (US)

(73) Assignee: Polycom, Inc., Milpitas, CA (US)

( * ) Notice: Subject to any disclaimer, the term of this patent is extended or adjusted under 35 U.S.C. 154(b) by 714 days.

(21) Appl. No.: 09/789,650

(22) Filed: Feb. 20, 2001

Related U.S. Application Data (60) Provisional application No. 60/228,911, filed on Aug. 29, 2000, provisional application No. 60/228,927, filed on Aug. 29, 2000.

(51) Int. Cl.[7] .............................................. H04M 12/28
(52) U.S. Cl. ................................. 379/350; 379/207.14
(58) Field of Search ................................ 709/201–203, 709/204, 213, 217–219, 227–234, 244–245, 709/250; 379/900, 93.23, 207.14, 242, 216, 379/219, 350; 455/403

(56) References Cited

U.S. PATENT DOCUMENTS

| | | | | |
|---|---|---|---|---|
| 5,742,905 A | * | 4/1998 | Pepe et al. | 455/461 |
| 5,835,089 A | * | 11/1998 | Skarbo et al. | 345/751 |
| 6,081,291 A | * | 6/2000 | Ludwig, Jr. | 348/14.11 |
| 6,094,213 A | * | 7/2000 | Mun et al. | 348/14.05 |
| 6,249,576 B1 | * | 6/2001 | Sassin et al. | 379/218.01 |
| 6,256,389 B1 | * | 7/2001 | Dalrymple et al. | 370/352 |
| 6,614,786 B1 | * | 9/2003 | Byers | 370/353 |
| 6,636,596 B1 | * | 10/2003 | Gallant et al. | 379/220.01 |

OTHER PUBLICATIONS

Andrew Findlay, The Multi-media Telephone: Directory Service and Session Control for Multi-media Communications, IEEE, Jul. 1996.*
Online Computing Dictionary, http://www.instantweb.com/foldoc/foldoc.cgi?query=Password, Oct. 27, 1994.*
Online Computing Dictionary, http://www.instantweb.com/foldoc/foldoc.cgi?query=LDAP, Jul. 5, 1999.*

* cited by examiner

*Primary Examiner*—Krisna Lim
(74) *Attorney, Agent, or Firm*—Wong, Cabello, Lutsch, Rutherford & Brucculeri, LLP (57) ABSTRACT

A central directory system for a network of dial-up communication devices is described. In a preferred embodiment, the communication devices are videoconferencing devices. The system includes a directory management module coupled to the network and configured for importing and exporting directory information to and from a communication device. The directory information received by the management module can be grouped into address books by an access control module coupled to a database in which the address books can be stored. The access control module is further functional to manage access to the address books. Embodiments of the directory system provide systems and methods for providing intelligent dialing service to the dial-up communication device. A dialing algorithm determines a dialing sequence to connect communication devices through a network based on geographic dialing rules and information related to the requesting device.

24 Claims, 8 Drawing Sheets

GLOBAL DIRECTORY SERVICE WITH INTELLIGENT DIALING

CROSS REFERENCE TO RELATED APPLICATION

The present application claims the benefit of priority from U.S. Provisional Patent Application No. 60/228,911, entitled "Global Directory Service With Intelligent Dialing" filed on Aug. 29, 2000, and is related to commonly owned U.S. Provisional Patent Application No. 60/228,927, entitled "Global Management of a Network of Communication Devices Through Distributed User Interfaces" filed on Aug. 29, 2000, which is incorporated by reference herein.

BACKGROUND

1. Field of the Invention

The present invention relates generally to communications equipment, and more particularly to a directory service for a network of communication devices.

2. Description of the Prior Art

Audio, video, and data conferencing systems have become an increasingly popular and valuable business communications tool. Videoconferencing systems are being utilized to facilitate natural communication between persons or groups of persons situated remotely from each other. Often within an enterprise, a network of videoconferencing devices is implemented to connect users within an office and at geographically dispersed offices to provide valuable communication tools, thus streamlining the communication and decision-making process and obviating the need for expensive and time-consuming business travel.

Often, each videoconferencing or other communication device on the network is configured to maintain an address book, or directory, locally at the device. The local address book may include IP network identification information, geographic location, PSTN dialing numbers, and the like, for a number of other devices. The address book may contain information relating to other devices connected through the enterprise network, as well as information relating to devices that are connected solely via the PSTN network. However, storing and maintaining directory information locally at a number of devices requires redundant effort and unnecessary, and thus inefficient, resource allocation and use as a result of the existence of repetitious information.

As is well known, the dialing codes for telephones and communication devices that utilize the public-switched telephone network (PSTN) vary from location to location. United States area codes are one example, but there are also international access codes, country codes, and city routing codes that must be included in the string of numbers dialed when attempting to connect between devices in different parts of the world. In addition, some businesses have private phone systems that require additional dialing codes to connect to the PSTN.

What is needed is a centralized directory for an enterprise network of dial-up communication devices. A specific need exists for a centralized directory for an enterprise network of videoconferencing devices. An additional need exists for a tool for providing intelligent global dialing for a dial-up communication device on an enterprise network.

SUMMARY

A central directory system for a network of dial-up communication devices is described. In preferred embodiments, the communication devices are videoconferencing devices. A communication device and a global directory server communicate through respective web servers, preferably via a standard communication protocol such as TCP/IP. The global directory services are provided by an application executing on a machine such as a computer. The application includes a user interface module, a directory management module, a dialing rules database, and a directory database.

The directory management module is coupled to the network and configured for importing and exporting directory information to and from a communication device. In one embodiment, directory information is automatically transmitted to the directory server by the communication device. In another embodiment, the server is configured to facilitate information exchange with other directory servers or services through the Lightweight Directory Access Protocol. The directory information received by the management module can be grouped into address books by an access control module coupled to a database in which the address books can be stored. The access control module is further functional to manage access to the address books, which includes prohibiting certain communication devices from viewing the directory information contained in the books.

Embodiments of the invention provide intelligent dialing service to the dial-up communication device. A dialing rules processor includes a dialing algorithm for determining a dialing sequence to connect communication devices through a network. The dialing sequence is determined based on geographic dialing rules, e.g., required country and city codes, and information related to the requesting device such as location and unique network connectivity requirements.

In addition to maintaining the dialing rules and information, a database is configured for storing user preferences related to connection parameters for their communication device, such as transmission protocol, transmission speed, and network connection configuration. The dialing rules processor is further provided with a dialing sequence initiator for converting the dialing sequence to a representative signal for transmission to the requesting communication device. The connection between the communication devices is initiated with minimal effort from the requesting device user, essentially by activating the "one button" process.

DETAILED DESCRIPTION OF PREFERRED EMBODIMENTS

Figure 1:
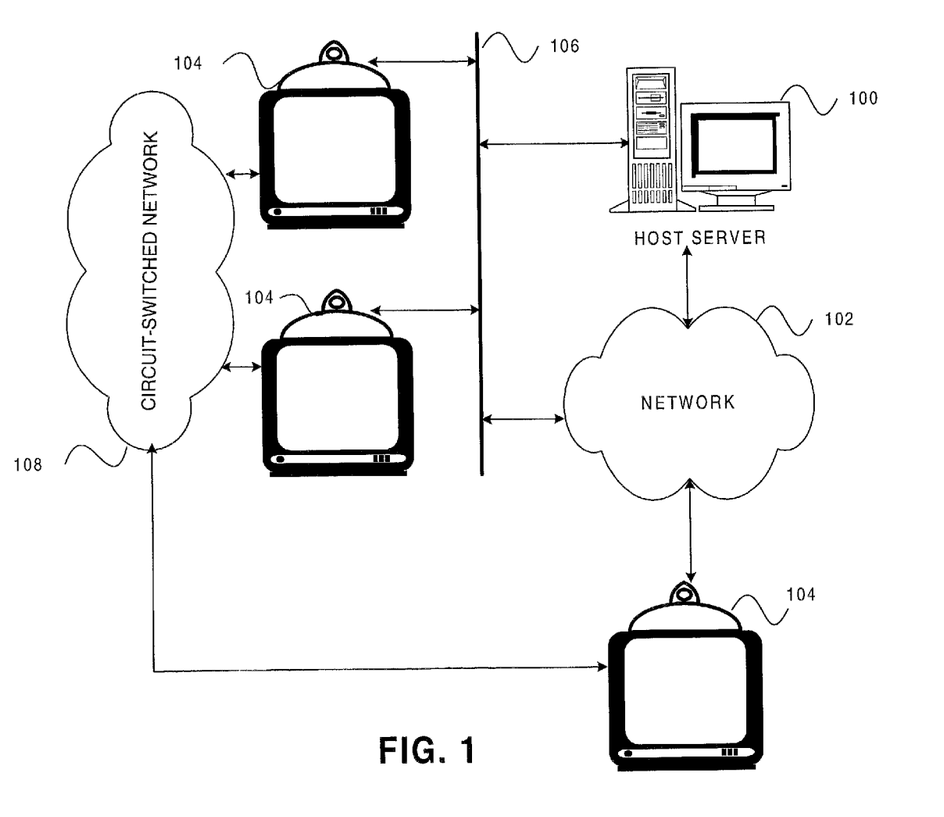
FIG. 1 depicts an exemplary operating environment of a global directory service system, in accordance with an embodiment of the invention.

FIG. 1 depicts an exemplary operating environment of a global directory service system, in accordance with an embodiment of the invention. A host server 100, such as a computer, is connected to a plurality of communication devices 104 through a wide area network (WAN) 102 or a local area network (LAN) 106 to enable communication therebetween. The host server 100 houses the global directory services application embodying the technology described herein. The preferred embodiment will be described as utilizing an enterprise network of videoconferencing devices, such as the ViewStation™ MP multi-point videoconferencing device available from Polycom, Inc. of Milpitas, Calif., as the communication devices 104. Those skilled in the art will recognize that the usefulness of the technology described herein is not limited to use with videoconferencing devices, and that it can be utilized in any number of environments and implementations.

Videoconferencing devices (VCD) 104 may be located at fixed or dynamic IP addresses on the WAN 102 or may be located at nodes of the LAN 106. The network 102 may comprise, for example, a WAN such as the Internet, and the LAN 106 may utilize technology such as Ethernet. Videoconferencing devices 104 are also connected to a circuit-switched network 108, such as the PSTN, for communicating with other communication devices (not shown) that are not members of the enterprise. VCDs 104 communicate with other communication devices through appropriate multimedia transmission protocols, for example the H.320 series of standards for Integrated Services Digital Networks (ISDN), and/or the H.324 series of standards for the Public Switched Telephone Network (PSTN), and/or the H.323 standard for IP-based networks. Host server 100 and VCD 104 preferably communicate through the LAN 106 via an appropriate standard such as the H.323 standard for IP-based networks, and via an appropriate protocol, such as Transmission Control Protocol/Internet Protocol (TCP/IP). Alternatively, the host server may communicate with VCD 104 via WAN 102 through appropriate transmission standards and protocols such as those discussed above.

Figure 2:
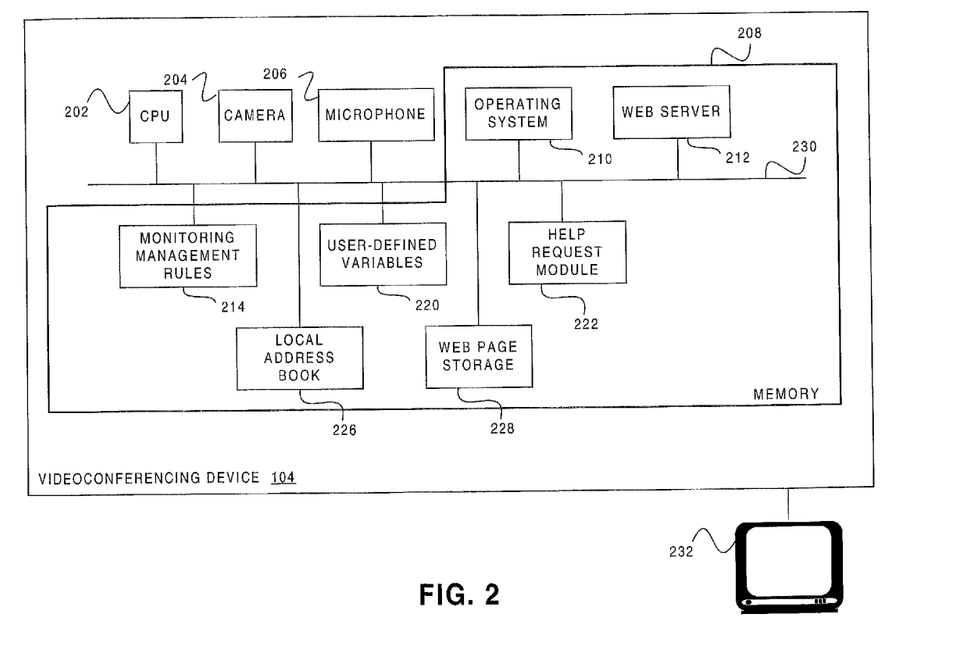
FIG. 2 depicts an exemplary architecture of a videoconferencing device, in accordance with an embodiment of the invention.

FIG. 2 depicts an exemplary architecture of a videoconferencing device 104. VCD 104 is provided with a central processing unit (CPU) 202, for executing program instructions. CPU 202 is intended to also represent other processors (for a non-limiting example, codecs, digital signal processors, etc.) embedded within device 104 to perform various audio and/or video processing and augmentation tasks. VCD 104 is also provided with a camera 204 that is operative for capturing images of activity occurring within its field of view and converting the images to electrical signals for transmission to and processing by CPU 202, and a microphone 206 that is operative for capturing audio information within its range of reception and converting the information to representative electrical signals for transmission to and processing by CPU 202.

A memory 208, which may include one or a combination of random access memory (RAM), read-only memory (ROM), or non-volatile storage devices, stores program instructions, files, and other data. Within the memory 208 are stored numerous applications representing functional components of VCD 104, including an operating system 210 configured for allocating memory, managing communications between VCD 104 components and processors, and performing other low-level operations. A web server 212 is configured for communicating through appropriate protocols such as TCP/IP and Hypertext Transfer Protocol [HTTP], with a VCD 104 user by serving a user interface (UI) to a connected user display 232. The web server 212 is further configured to communicate with, for example, the host device 100 through LAN 106 (FIG. 1) or network 102 (FIG. 1), and with other communication devices (not shown). Monitoring management rules 214 are in memory 208, for maintaining administrative rights to the device 104. For example, rules are present for, inter alia, managing whether a specific application, such as the global directory services described herein, has access to the specific device 104, and what level of rights the application may have.

User-defined variables 220 describe information about the device 104, which is input by the VCD 104 user upon system configuration and set-up. Examples include the VCD 104 name, IP address, and telephone number.

A VCD 104 can be configured for distributed management, thus being manageable by a plurality of management systems through the network 102, such as the Internet. This feature allows for web-based management of the VCD 104 from anywhere that Internet access is available.

Still referencing FIG. 2, the memory 208 is further provided with a help request module 222 for providing a mechanism whereby a VCD 104 user can request assistance from a remote network manager. Operation of the help request module 222 includes transmission of the requesting VCD 104 identification information to a management interface, as well as transmission of an electronic notification to the network manager. The electronic notification may include, for example, a page to a pager device or beeper (not shown) or an e-mail. Upon a user request for assistance, the VCD 104 user interface will be displayed on the network manager's display monitor, which is display device 304 (FIG. 3) for this discussion.

A local address book 226 is provided for local storage of dial-up directory and identification information for local and/or remote communication devices with which VCD 104 may communicate. For example, directory information includes but is not limited to device nomenclature information and the device connection dial-up number. The local address book is also automatically provided, or pushed, to the host server 100 upon VCD 104 registration with the global management and directory system, and on subsequent occasions. Push technology generally employs the delivery of information over a network that is initiated by the information source, or VCD 104, rather than by the information user, such as network manager at host server 100 (FIG. 1). Data transmission to the global directory services 320 (FIG. 3), which provides a real-time electronic dial-up directory to all the VCDs 104 on the enterprise network and provides one-button intelligent dialing, occurs via the web server 212. Finally, web page storage 228 is provided in memory 208 for storing HTML documents served by web server 212 to various connected devices. The components of VCD 104 are coupled in communication by at least one bus 230.

Figure 3:
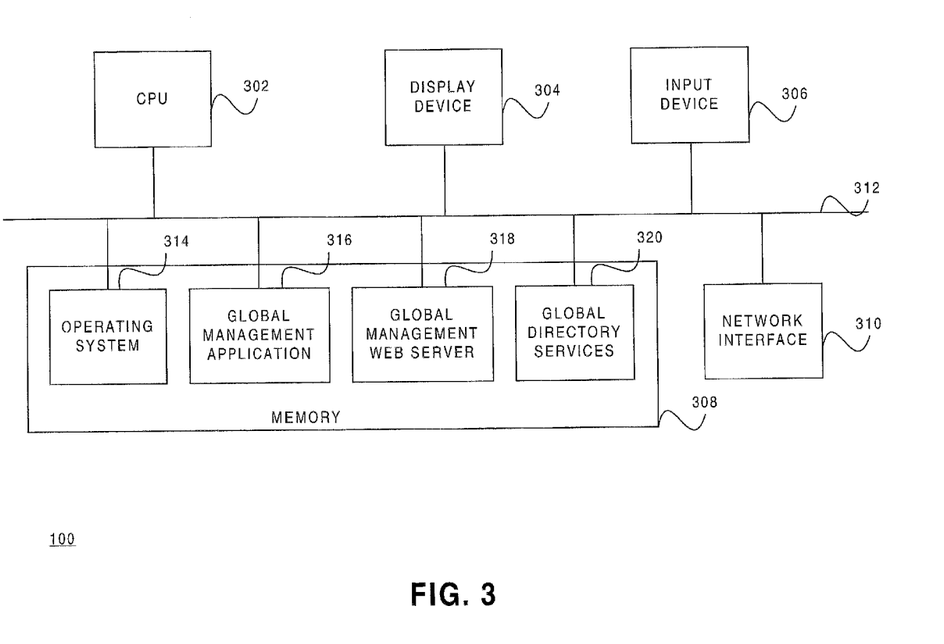
FIG. 3 depicts exemplary components of a host server embodying a global directory service for a network of videoconferencing devices, in accordance with an embodiment of the invention.

FIG. 3 depicts exemplary components of a host server 100 embodying a global directory service for a network of videoconferencing devices 104. Host server 100 is configured to include a central processing unit (CPU) 302, a display device 304, an input device 306, memory 308, and a network interface 310, interconnected for communication by at least one bus 312.

The CPU 302 is for interpreting and executing application program instructions stored in memory 308. The display device 304, which may comprise a conventional CRT or LCD monitor, is coupled to a video input/output interface (not shown) which may comprise any one of a number of commercially available video display cards or may comprise circuitry incorporated into a computer motherboard or CPU 302. Display device 304 is configured to display images and text to a user, including the display of a global directory information and the local address book 226 (FIG. 2) of VCDs 104. The input device 306, which may comprise one or a combination of keyboard, trackball, mouse, and the like, is provided for facilitating the input of information and commands into the host server 100.

Memory 308, which may include one or a combination of random access memory (RAM), read-only memory (ROM), or non-volatile storage devices such as magnetic hard disks, CD-ROMs, and magneto-optical drives, stores program instructions, files, and other data. An operating system 314, a global management application 316, a global management web server 318, and global directory services 320, are stored within the memory 308.

The operating system 314 is operative for allocating memory, managing communications between host server 100 components, and performing other low-level operations. The global management application 316 and the global management server 318 embody a system and method for globally managing a network of videoconferencing devices 104 through user interfaces created at and distributed from the VCDs 104. The global directory services (GDS) 320 embody the system and method of the present invention for providing central directory services and intelligent dialing to an enterprise videoconferencing network.

Finally, the network interface 310, such as a modem or Ethernet card, is provided to enable communication with one or more remote devices over the network 102 (FIG. 1) or over the LAN 106 (FIG. 1).

Figure 4:
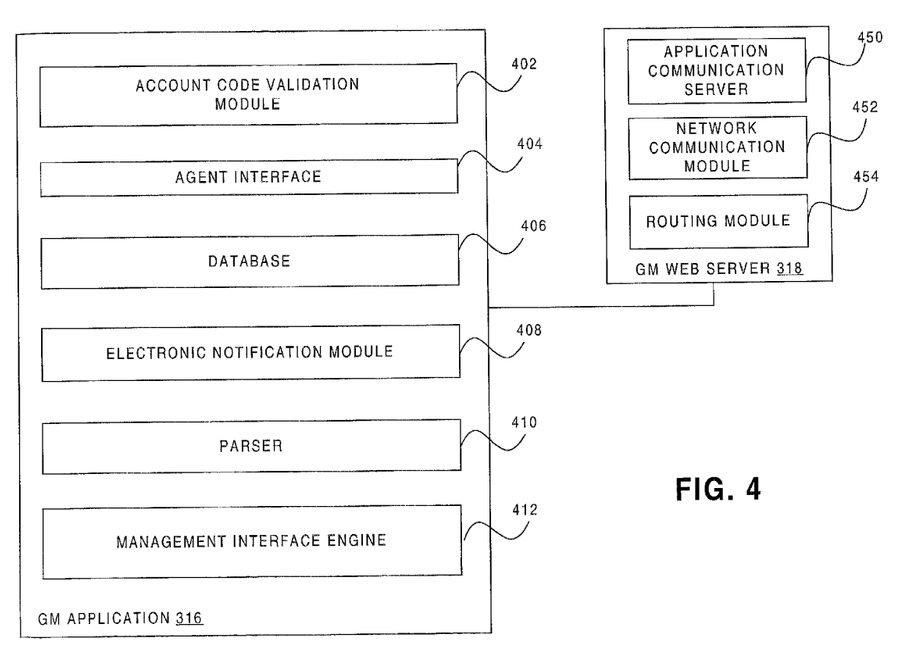
FIG. 4 depicts a global management system application and web server for remotely managing a network of videoconferencing devices.

FIG. 4 depicts exemplary components of the global management (GM) application 316 and the global management (GM) web server 318, which function together to provide a system for globally managing a network of communication devices 104 (FIG. 1), such as videoconferencing devices. The GM application 316 is provided with an account code validation module 402, an agent interface 404, a database 406, an electronic notification module 408, a parser 410, and a management interface engine 412.

The account code validation module 402 is configured for receiving and processing codes sent from VCD 104 (FIG. 1) to validate an individual's authorization to use the VCD 104. This feature may be utilized, for example, in a situation where the VCD 104 is available for public use and a user is required to obtain access authority, and is further operative to log public use of the VCD 104 for billing purposes. An additional exemplary usage of this feature is the situation in which it is desired to track VCD 104 usage by corporate departments.

The agent interface 404 is provided for facilitating tiered management, whereby a higher level of management (possibly a third party application) is allowed access to several GM applications 316, and thus the enterprise network of videoconferencing devices 104 is managed by each GM application 316. The agent interface 404 is operative to provide to the upper level of management the capability to monitor and manage several networks, as well as the ability to monitor the states of several GM applications 316. Other management programs communicate with the GM application 316 through the agent interface 404 utilizing a suitable protocol, such as SNMP (Simple Network Management Protocol). Furthermore, the agent interface 404 facilitates reporting network activity mishaps to the network manager through use of MIBs (Management Information Base).

The database 406 is provided for storing various VCD 104, network 102 (FIG. 1) or LAN 106 (FIG. 1) information, which includes for example, the VCD 104 IP address, the VCD 104 call history detail, and the network 102 or 106 status history. The electronic notification module 408 provides capability for a VCD 104 user to notify a network manager electronically, for example, via an alarm from host server 100, an e-mail, a page, or a phone call. The VCD 104 user communicates with the electronic notification module 408 by interacting with the help request module 222 (FIG. 2), for example, by pressing a help button on the VCD 104. The electronic notification module 408 receives and processes the request for help and transmits a request notification, in one or a combination of the various forms discussed above, to the network manager over the network 102 or the LAN 106.

Attention is now directed to the GM web server 318 depicted in FIG. 4, which includes an application communication server 450, a network communication module 452, and a routing module 454. The GM web server 318 is operable to communicate and exchange information with the VCD 104 web server 212 (FIG. 2) through utilization of appropriate communication protocols, such as TCP/IP, embodied in network communication module 452. The network communication module 452 is further operative to determine whether the information it has received from web server 212 is valid for the GM application 316 and/or the GDS 320. If the network communication module 452 determines that the information is valid, then the information gets passed to a routing module 454 which is configured to route the information to the appropriate application, i.e., GM application 316 or global directory services 320 (FIG. 3), via the application communication server 450. Preferably, the application communication server 450 of GM web server 318 utilizes a CGI application to communicate with the GM application 316 or global directory services 320.

When information from VCD 104 web server 212 (FIG. 2) is received by the GM application 316 via GM web server 318, the parser 410 parses, or divides and analyzes, the information. The information received from VCD 104 may include, for example, parameterized values representative of VCD 104 functional states. These parameterized values may represent current and past states of the VCD 104. In one embodiment, the information received from VCD 104 is represented by Extensible Markup Language (XML) and includes both the data describing functional states of the VCD as well as the format of the data. In this manner, the parser 410 operates upon information that both the VCD 104 and the GM application 316 can interpret, and consequently a network manager can view information that is deemed relevant by the VCD 104 user and in a format representing the VCD 104 user interface. Different VCD 104 users may configure their VCD 104 to function differently and may consider different data to be important to the associated functionality and to the management thereof.

By the described method of information exchange between each VCD 104 in the enterprise network and the GM application 316, a network manager is able to remotely manage each VCD 104 independently and efficiently through distributed user interfaces. This affords the network manager an optimal representation of the VCD 104 for diagnostic and management purposes, and provides instant management functionality without the requirement for extensive interface programming. Furthermore, VCDs 104 can be added to the network without significantly impacting the GM application 316. The GM application 316 is further operative to store the received information in the database 406 for future analysis and use.

Figure 5:
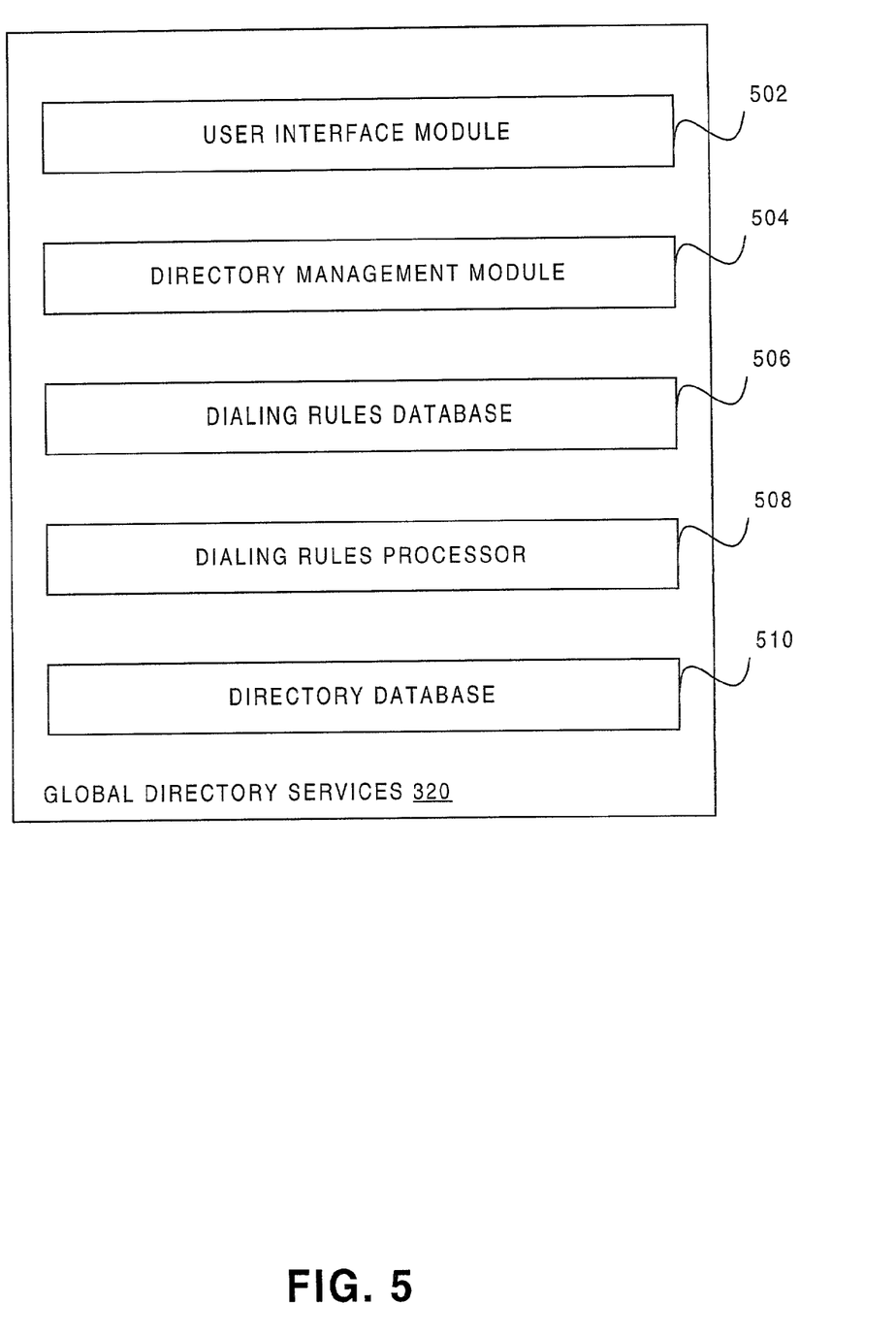
FIG. 5 depicts exemplary components of a global directory services application, in accordance with an embodiment of the invention.

FIG. 5 depicts exemplary components of the global directory services (GDS) 320. The GDS 320 is provided with a user interface (UI) module 502, a directory management module 504, a dialing rules database 506, a dialing rules processor 508, and a directory database 510. Some of the GDS 320 components are described in more detail in reference to FIGS. 6–9.

Figure 6:
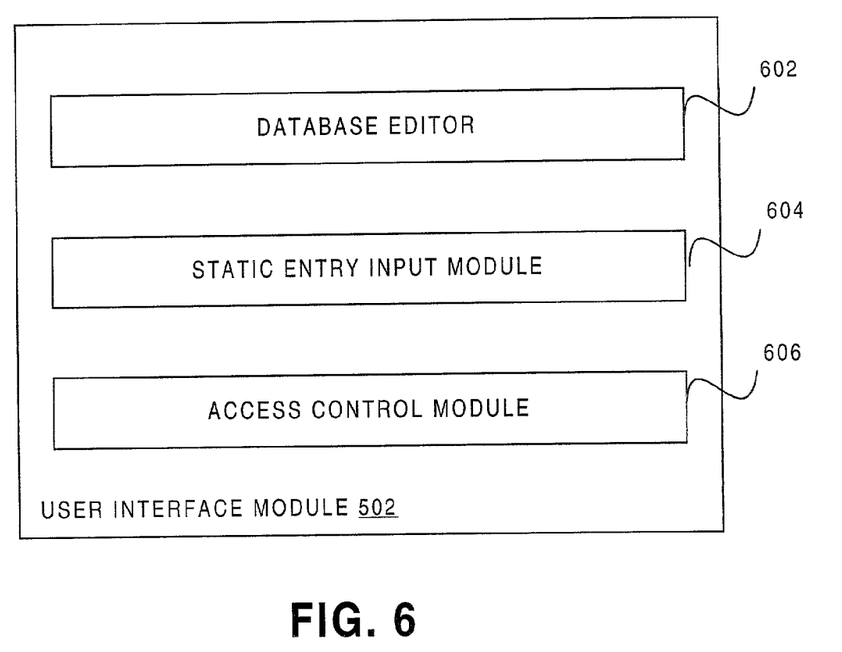
FIG. 6 depicts exemplary components of a user interface module of the global directory services application of FIG. 5, according to an embodiment of the invention.

FIG. 6 depicts exemplary components of the UI module 502. The UI module 502 is operative to view information retrieved from database 406 (FIG. 4) of GM application 316 (FIGS. 3 and 4), allowing a directory manager to view identification and geographic location information for each of the registered VCDs 104 (FIG. 2) on the enterprise network. UI module 502 is further operative, through utilization of database editor 602, to view and manipulate directory information stored in directory database 510. The information stored in database 510 typically has been automatically pushed from VCD 104 or has been manually entered through utilization of static entry input module 604. Manual data entry is required for entries representing identification and directory information from legacy communication devices that are not configured to push the information to the GDS 320 (FIGS. 3 and 5).

UI module 502 is also provided with an access control module 606 for allowing directory administrators to group the directory information, for example, for different corporate departments, countries, buildings, and the like. An administrator can use the access control module 606 to relate directory information from various dial-up communication devices with various permission groups, or address books, and to relate various enterprise VCDs 104 with the address books that they are authorized to access. These relations are recorded in the directory database 510 (FIG. 5). Information relating to a single communication device may be included in a plurality of address books, and a VCD 104 may be authorized to access a plurality of address books. In addition, the access control module 606 allows a VCD 104 user to specify other enterprise VCDs 104 that may be authorized to access a personal, or semi-private, directory group.

Figure 7:
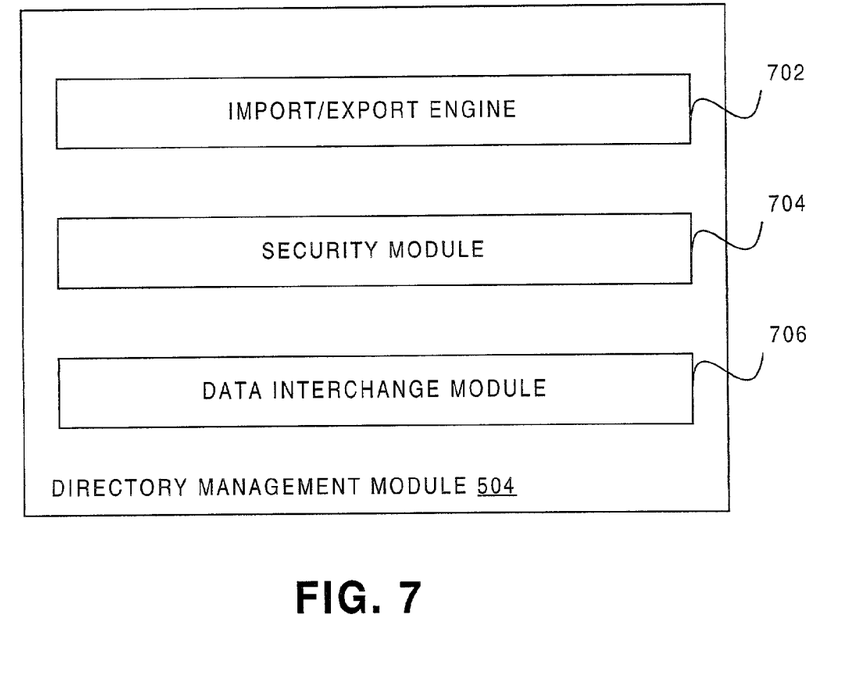
FIG. 7 depicts exemplary components of a directory management module of the global directory services application of FIG. 5, according to an embodiment of the invention.

FIG. 7 depicts exemplary components of the directory management module 504. The directory management module 504 is operative to manage communication with, inter alia, the enterprise VCDs 104 (FIG. 2), with the access control module 606 (FIG. 6) of UI module 502 (FIG. 5), and with third party directory applications through GM web server 318 (FIG. 3). Directory management module 504 is provided with an import/export engine 702, a security module 704, and a data interchange module 706.

Import/export engine 702 is operative to receive the imported identification and directory information provided by the enterprise VCDs 104. As previously described, the VCD 104 pushes user-entered system identification and location information to the GDS 320 (FIGS. 3 and 5) via the web servers 212 (FIG. 2) and 318 (FIGS. 3 and 4). More specifically, the information is transmitted from the VCD 104 web server 212 to the network communication module 452 (FIG. 4) of the GM web server 318. The information then gets passed to the routing module 454 (FIG. 4) which routes the information to the appropriate application, i.e., GM application 316 (FIGS. 3 and 4) or GDS 320(FIGS. 3 and 5), via the application communication server 450 (FIG. 4). If routed to the GDS 320, the information is received by the import/export engine 702 of directory management module 504, where it can be directed to various subcomponents of GDS 320 such as the user interface module 502 (FIG. 5), the dialing rules processor 508 (FIG. 5), and the directory database 510 (FIG. 5). The import/export engine 702 is further operative to communicate with the directory database 510 of GDS 320 for facilitating the export of directory information back to the enterprise VCDs 104, again through web servers 318 and 212, to fulfill directory requests from a VCD 104 user.

The security module 704 is operative to validate the authorization of user requests for directory information. Namely, the security module 704 functions to verify administration passwords transmitted from a VCD 104, which may be required to utilize the GDS 320 (FIGS. 3 and 5). Once user authorization has been verified by the security module 704, the user can access any of the address books for which their VCD 104 has been permitted. Access to the specific address books is managed through access control module 606, as described in reference to FIG. 6.

The data interchange module 706 facilitates the exchange of directory information between standardized corporate directories using the LDAP (Lightweight Directory Access Protocol) directory protocol and the GDS 320 (FIGS. 3 and 5), essentially allowing the GDS 320 to access and interpret third party directory information. This feature additionally facilitates replicating directory information from one GDS 320 to another GDS 320 through an LDAP server, thereby providing an organization with remote or international locations the capability of synchronizing their directories among locations. It is contemplated that the data interchange module 706 also supports other directory protocols, including proprietary protocols such as ILS (Internet Locator Server) for Microsoft® NetMeeting®.

Figure 8:
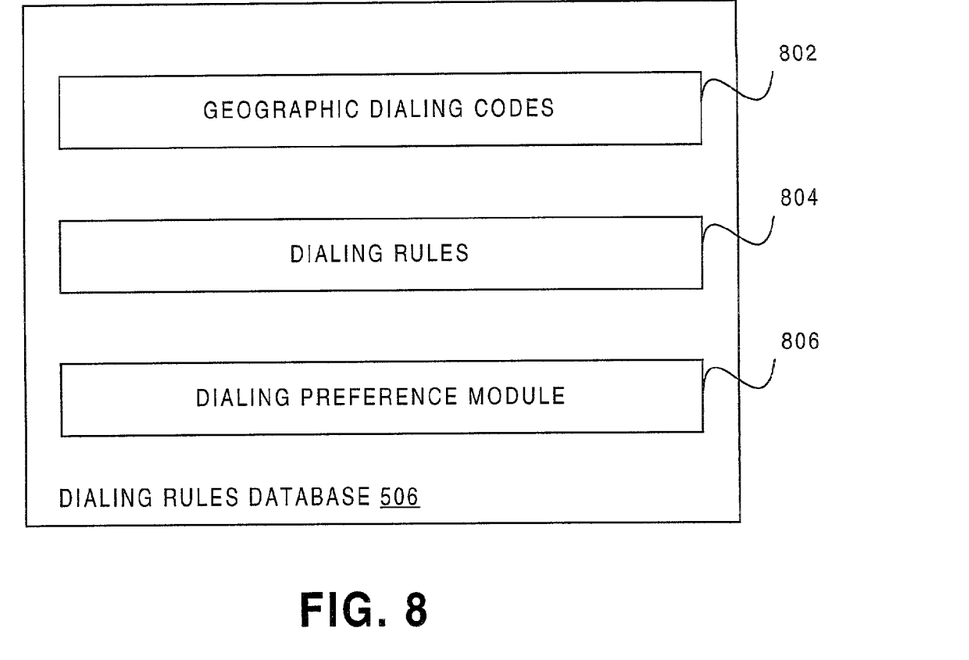
FIG. 8 depicts exemplary components of a dialing rules database of the global directory services application of FIG. 5, according to an embodiment of the invention.

FIG. 8 depicts exemplary components of the dialing rules database 506, including geographic dialing codes 802, dialing rules 804, and a dialing preference module 806. The geographic dialing codes 802 comprises a database of at least the U.S. area codes, international access codes, country codes, and city routing codes that must be included in the string of numbers dialed when attempting to connect between communication devices in different parts of the world. The dialing rules 804 comprise local dialing rules related to each VCD 104 (FIG. 2) on the enterprise network, regarding when certain dialing strings are required to connect to the PSTN or other devices connected to the PSTN. Examples of dialing rules include rules as to when an area code is required, when a toll call identifier is required, when an additional code is required to connect to the PSTN from an enterprise phone network, and the like.

The dialing preference module 806 comprises data representing personal dialing preferences of individual VCDs 104. Examples of dialing preferences include the preferred type of transmission protocol for connecting to another communication device (e.g., H.320 series of standards for ISDN, or H.323 standards for IP-based networks), and the preferred transmission speed (e.g., 2×64 kbps). The user-defined preferences are received from the VCD 104 and are accessible by the dialing rules processor 508.

Figure 9:
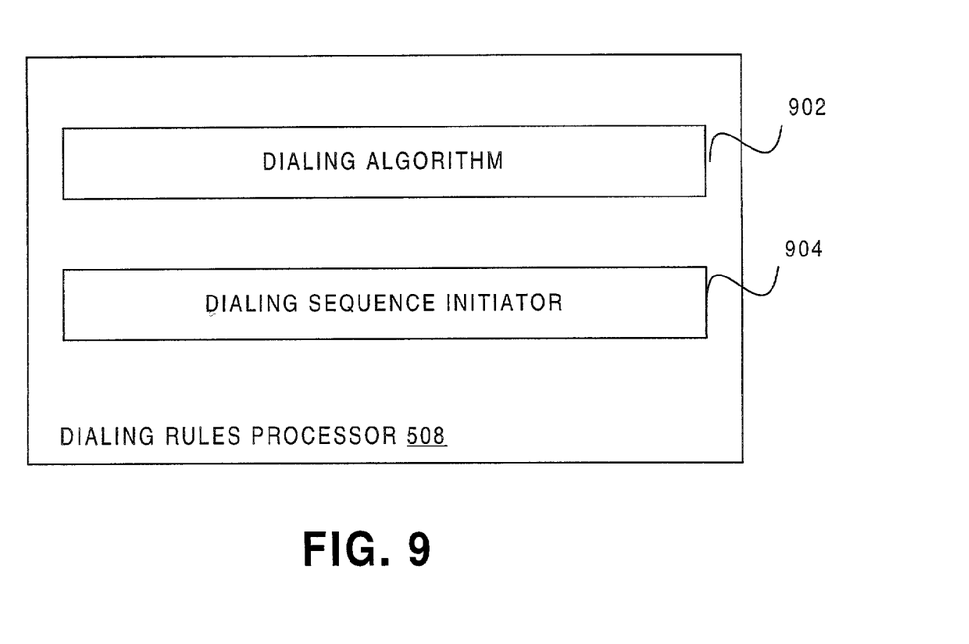
FIG. 9 depicts exemplary components of a dialing rules processor of the global directory services application of FIG. 5, according to an embodiment of the invention.

FIG. 9 depicts exemplary components of the dialing rules processor 508, including a dialing algorithm 902 and a dialing sequence initiator 904. The dialing rules processor 508 embodies the intelligent dialing feature of a preferred embodiment. A VCD 104 (FIG. 2) user may request a connection with another communication device through the PSTN, which is routed to the GDS 320 (FIGS. 3 and 5) and specifically to the dialing rules processor 508. The request is preferably implemented by a VCD 104 user accessing the directory database 510 of the GDS 320 and selecting the desired communication device from the list. The dialing algorithm 902 references the dialing rules 804 and the dialing codes 802 to determine the dialing sequence necessary to connect the requesting VCD 104 to the selected device. The dialing sequence is determined based on the location and rules governing the requesting VCD 104 and on the location of the selected communication device.

Upon determining the required dialing sequence, the dialing algorithm 902 is capable of passing this sequence to the dialing sequence initiator 904. The dialing sequence initiator 904 is operative to convert the dialing sequence to a signal representing the dual tone multi-frequency (DTMF) tones necessary for establishing a connection over the circuit-switched network 108 (FIG. 1), or PSTN. The signal is transmitted to the VCD 104 for utilization in automatically connecting to the PSTN without requiring the VCD 104 user to manually enter the dialing sequence. The dialing sequence initiator 904 is also capable of retrieving personal dialing preferences from the dialing rules database 506 as described in reference to FIG. 8, for implementation with the dialing sequence signal provided to the VCD 104.

Figure 10:
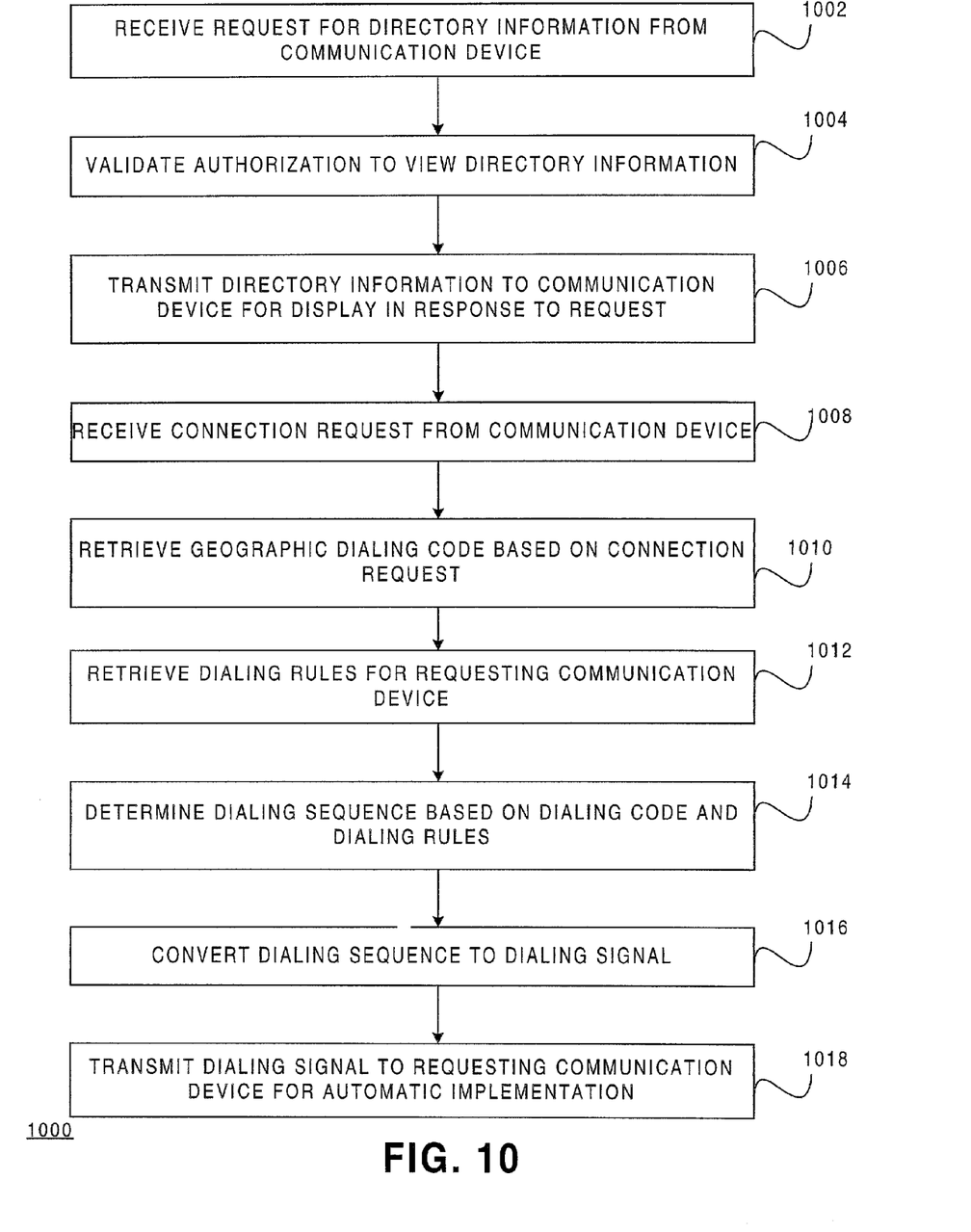
FIG. 10 is a flowchart depicting a method for providing intelligent dialing service to a dial-up communication device, according to an embodiment of the invention.

FIG. 10 is a flowchart depicting a method 1000 for providing intelligent dialing service to a dial-up communication device, according to an embodiment of the invention. Once a VCD 104 (FIG. 2) has registered and been initialized with the GDS 320 (FIGS. 3 and 5), the VCD 104 user has access to the GDS 320 and thus to the directory database 510 (FIG. 5). Users can request access to an address book, the request being received by the GDS 320, step 1002. At step 1004, the security module 704 (FIG. 7) will determine if the VCD 104 is authorized to view the requested address book and associated directory information. In response to an authorized request, the import/export engine 702 (FIG. 7) transmits the requested directory information to the VCD 104 for viewing on display 232 (FIG. 2), step 1006.

From the directory information, a user can select a communication device to which the user wants to connect by performing a connection action such as selecting a "connect" icon. At step 1008, the GDS 320 receives the connection request from the VCD 104. The connection request is routed to the dialing rules processor 508 (FIGS. 5 and 9), whereby at step 1010 the dialing algorithm 902 (FIG. 9) retrieves geographic dialing code(s) for the communication device to which the user wants to connect. For example, if the user wants to connect to a communication device with phone number "123-4567" in Paris, France, the dialing algorithm 902 retrieves the France country code "33" and the Paris city code "1". The dialing algorithm 902 also retrieves from dialing rules 804 (FIG. 8), any unique dialing rules associated with the requesting VCD 104, step 1012. For example, the enterprise telephone system may require a "9" be dialed to reach the outside public telephone network.

At step 1014, the dialing algorithm determines the dialing sequence required to connect the requesting VCD 104 to the desired device based on the codes and rules obtained in steps 1010 and 1012 and the phone number of the desired communication device stored in directory database 510 (FIG. 5). Continuing with the example, the dialing sequence would be "9-33-1-123-4567". The dialing sequence is then converted to a signal, step 1016, that is transmitted to the requesting VCD 104 for automatic dialing and connecting to the desired communication device over the public network, step 1018. It can be appreciated that a different enterprise VCD 104 located in another country could request connection with the same desired communication device in the same manner as described above, whereby the dialing algorithm 902 (FIG. 9) would determine a different dialing sequence based on the geographic location and dialing rules related to that requesting VCD 104. Thus, the intelligent dialing service provided by the GDS 320 (FIGS. 3 and 5) minimizes the effort required for a VCD 104 user to connect to, or dial-up, another communication device such as a videoconferencing device, essentially providing "one-button" dialing.

It will be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A system for providing intelligent global dialing service to a dial-up communication device, comprising:
   a first communication device connected to a telephone network, configured for communicating with a second communication device through the telephone network, the first device being further connected to a second network; and
   a directory server connected to the second network, configured for receiving information from the first communication device, determining a dialing sequence to connect the first communication device to the second communication device through the telephone network based on the received information, and transmitting the dialing sequence to the first communication device.

2. The system of claim 1, wherein the received information includes information identifying the geographic location of the first communication device.

3. The system of claim 2, wherein the received information further includes dialing rules for connecting to the telephone network specific to the first communication device.

4. The system of claim 1, wherein the second network is a local area network.

5. The system of claim 1, wherein the second network is a wide area network.

6. The system of claim 1, wherein the first communication device and the directory server communicate via TCP/IP.

7. The system of claim 1, wherein the first communication device automatically transmits the information to the directory server.

8. A global directory server for providing dialing service to a communication device coupled to a network, comprising:
   a rules database comprising geographic dialing rules;
   a directory management module coupled to a first communication device, configured for importing information from the first communication device; and a dialing algorithm coupled to the rules database and to the directory management module, configured for determining a dialing sequence to connect the first communication device to a second communication device based on the geographic dialing rules and the imported information.

9. The server of claim 8, further comprising:
a dialing sequence initiator coupled to the dialing algorithm and the first communication device, configured for initiating the dialing sequence to connect the first communication device to the second communication device through a telephone network.

10. The server of claim 9, wherein the dialing preference includes a communication transmission rate.

11. The server of claim 9, wherein the dialing preference includes a communication transmission protocol.

12. A central directory system for an enterprise network of dial-up communication devices, the enterprise communication devices being coupled to a telephone network for communication with remote communication devices, comprising:
a directory management module coupled to the enterprise network, configured for importing directory information from at least one enterprise communication device;
a database coupled to the directory management module, configured for storing the directory information; and
an access control module coupled to the database, configured for grouping the directory information into at least one address book for recordation in the database and for managing access to the address book.

13. The directory system of claim 12, wherein the enterprise communication devices are videoconferencing devices.

14. The directory system of claim 13, wherein the directory information is automatically transmitted from the at least one enterprise communication device.

15. The directory system of claim 12, wherein the directory management module is further configured for exporting directory information to the enterprise communication device.

16. The directory system of claim 15, wherein the enterprise communication device is required to submit a password to access the directory information.

17. The directory system of claim 12, wherein managing access to the address book includes prohibiting the enterprise communication device from accessing the address book.

18. The directory system of claim 12, wherein managing access to the address book includes receiving a command from the at least one enterprise communication device, the command specifying another enterprise communication device that may access the address book.

19. The directory system of claim 12, wherein the directory management module is further configured to exchange information utilizing LDAP data interchange format.

20. A global directory server for providing dialing service to a communication device coupled to a network, comprising:
a rules database comprising geographic dialing rules;
a directory management module coupled to a first communication device, configured for importing information from the first communication device;
a dialing algorithm coupled to the rules database and to the directory management module, configured for determining a dialing sequence to connect the first communication device to a second communication device based on the geographic dialing rules and the imported information;
a dialing sequence initiator coupled to the dialing algorithm and the first communication device, configured for initiating the dialing sequence to connect the first communication device to the second communication device through a telephone network; and
a dialing preference module coupled to the first communication device, configured for receiving a dialing preference from the first communication device;
wherein the dialing sequence initiator is further configured for initiating the dialing sequence according to the dialing preference.

21. A machine-readable medium having embodied thereon a program, the program being executable by a machine to perform method steps for providing dialing service to a dial-up communication device, the method steps comprising:
receiving from the communication device a request for connection to a second communication device;
retrieving a dialing code related to the second communication device;
retrieving a dialing rule related to the communication device;
determining a dialing sequence to connect the communication device to the second communication device through a telephone network based on the dialing code and the dialing rule; and
converting the dialing sequence to a dialing signal for transmission to the communication deviated.

22. A machine-readable medium having embodied thereon a program, the program being executable by a machine to perform method steps for providing dialing service to a dial-up communication device, the method steps comprising:
receiving from the communication device a request for connection to a second communication device;
retrieving a dialing code related to the second communication device;
retrieving a dialing rule related to the communication device; and
determining a dialing sequence to connect the communication device to the second communication device through a telephone network based on the dialing code and the dialing rule.

23. The machine-readable medium of claim 22, the program further comprising the step of:
converting the dialing sequence to a dialing signal for transmission to the communication device.

24. A system for providing dialing service to a dial-up communication device, comprising:
means for maintaining a database of geographic dialing codes;
means for maintaining information related to the communication device; and
means for determining a dialing sequence to connect the communication device to a second communication device through a telephone network based on the geographic dialing codes and the information related to the communication device.

* * * * *

UNITED STATES PATENT AND TRADEMARK OFFICE
CERTIFICATE OF CORRECTION

PATENT NO. : 6,975,721 B1
DATED : December 13, 2005
INVENTOR(S) : Alain Nimri and Keath Milligan It is certified that error appears in the above-identified patent and that said Letters Patent is hereby corrected as shown below:

Column 12,
Line 32, "deviated" should be -- device --.

Signed and Sealed this

Seventh Day of February, 2006

JON W. DUDAS
*Director of the United States Patent and Trademark Office*